·

US008402988B2

(12) United States Patent
Campau (10) Patent No.: US 8,402,988 B2
(45) Date of Patent: *Mar. 26, 2013

(54) STEM-MOUNTED TIRE INFLATION PRESSURE REGULATOR (75) Inventor: Daniel N. Campau, Ada, MI (US)

(73) Assignee: Flow-Rite Controls, Ltd., Byron Center, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/323,968

(22) Filed: Dec. 13, 2011

(65) Prior Publication Data

US 2012/0097264 A1 Apr. 26, 2012

Related U.S. Application Data (63) Continuation of application No. 11/872,163, filed on Oct. 15, 2007, now Pat. No. 8,113,234.

(51) Int. Cl.
F16K 31/12 (2006.01)

(52) U.S. Cl. ........ 137/226; 137/233; 137/227; 152/415; 152/431

(58) Field of Classification Search .................. 137/225, 137/226, 232, 233, 505.25, 227, 557; 152/415, 152/531; 411/262; 285/386
See application file for complete search history.

(56) References Cited

U.S. PATENT DOCUMENTS

| 152,249 | A | 6/1874 | Penfield |
|---|---|---|---|
| 422,027 | A | 2/1890 | Marshall |
| 787,298 | A | 4/1905 | Keller, Jr. |
| 900,589 | A | 10/1908 | Ratcliffe |
| 1,053,623 | A | 2/1913 | McMillion |
| 1,166,221 | A | 12/1915 | Kahn |
| 1,292,934 | A | 1/1919 | Walmsley |
| 1,502,555 | A | 7/1924 | Arvid |
| 1,584,934 | A | 5/1926 | Harris |
| 1,738,621 | A | 12/1929 | Washington |
| 1,772,107 | A | 8/1930 | Nelson |
| 2,587,560 | A | 2/1952 | Widmer |

(Continued)

FOREIGN PATENT DOCUMENTS

| AT | 375452 | 8/1984 |
|---|---|---|
| EP | 1760334 | 3/2007 |

(Continued)

OTHER PUBLICATIONS

PCT Invitation to Pay Additional Fees and, Where Applicable, Protest Fee, dated Dec. 23, 2008.

(Continued)

Primary Examiner — Craig Schneider
Assistant Examiner — Craig J Price
(74) Attorney, Agent, or Firm — Warner Norcross & Judd LLP (57) ABSTRACT The specification discloses a tire inflation pressure regulator facilitating precise tire inflation. The regulator includes a body, a two-position valve within the body, and a rotational lock. The body includes an air inlet, an air outlet, and an air vent. In one position, the valve directs air from the air inlet to the air outlet when the tire pressure is below a preset level; and, in a second position, the valve directs air from the air inlet to the air vent when the tire pressure exceeds the preset level to prevent overfilling. The valve moves rapidly between the two positions, and is unstable between the two positions. The valve includes a regulator enabling the preset level to be adjusted. The rotational lock enables the regulator to be screwed onto a tire stem, but prevents removal of the regulator from the tire stem without a key.

15 Claims, 9 Drawing Sheets

U.S. PATENT DOCUMENTS

| | | | |
|---|---|---|---|
| 2,823,725 A | 2/1958 | Frederick | |
| 2,915,035 A * | 12/1959 | Russell | 152/415 |
| 2,954,796 A | 10/1960 | Marshal | |
| 3,391,720 A | 7/1968 | Morse | |
| 3,450,147 A | 6/1969 | Webb | |
| 3,491,786 A | 1/1970 | Crossman et al. | |
| 3,537,469 A | 11/1970 | Hagar | |
| 3,565,149 A | 2/1971 | Wetzel | |
| 3,701,372 A | 10/1972 | Breed | |
| 3,994,312 A | 11/1976 | Tanner et al. | |
| 4,102,297 A | 7/1978 | Reilly | |
| 4,421,052 A | 12/1983 | Cook | |
| 4,445,527 A | 5/1984 | Leimbach | |
| 4,660,590 A | 4/1987 | Sanchez | |
| 4,790,347 A | 12/1988 | Weirich et al. | |
| 4,983,085 A | 1/1991 | Gray | |
| 5,365,967 A | 11/1994 | Moore | |
| 5,529,348 A | 6/1996 | Wasserman et al. | |
| 5,924,444 A | 7/1999 | Fendel | |
| 6,015,251 A | 1/2000 | Chung | |
| 6,302,138 B1 | 10/2001 | Sumrall | |
| 7,021,326 B2 | 4/2006 | Rogier | |
| 7,032,611 B1 | 4/2006 | Sheng | |
| 7,104,274 B2 | 9/2006 | Sampson | |
| 8,113,234 B2 * | 2/2012 | Campau | 137/505.25 |
| 2004/0256005 A1 | 12/2004 | Kayukawa | |
| 2007/0169818 A1 | 7/2007 | Badstue | |

FOREIGN PATENT DOCUMENTS

| | | |
|---|---|---|
| FR | 2544030 | 10/1984 |
| GB | 221456 | 9/1924 |

OTHER PUBLICATIONS

United States Statutory Invention Registration No. H1588, published Sep. 3, 1996, entitlted "Helical Spring Fastener".

PCT Notification of Transmittal of the International Search Report and the Written Opinion of the International Searching Authority, or the Declaration; International Search Report; Written Opinion of the International Searching Authority, dated May 31, 2010 in PCT Application No. PCT/US2010/026196.

English translation of French Patent Application 2,544,030 to Gresz et al.

PCT Notification of Transmittal of the International Search Report and the Written Opinion of the International Searching Authority, or the Declaration; International Search Report; Written Opinion of the International Searching Authority, dated Dec. 19, 2008 in PCT Application No. PCT/US2008/076155.

English translation of Austrian Patent 375,452 to Schleicher.

* cited by examiner

STEM-MOUNTED TIRE INFLATION PRESSURE REGULATOR

BACKGROUND OF THE INVENTION

The present invention relates to tire inflation pressure regulators, and more particularly to such regulators that can be installed or mounted directly on a conventional tire valve stem.

A great deal of government and industry attention has been focused on the problems associated with under-inflated vehicle tires. Tires naturally lose air pressure because of permeation through the tire wall at the rate of about two pounds per square inch (PSI) per month. Under-inflated tires adversely affect vehicle handling, can lower hydroplaning speed, and increase stopping distance. Under-inflation also increases the rolling resistance of tires, leading to reduced fuel economy, increased hydrocarbon and toxic chemical emissions, and reduced tire life due to an increase in tire wall temperature and increased tread wear.

On a national scale, these problems have a significant impact on safety, energy usage, the environment, and waste management. For example, the National Highway Traffic Safety Administration (NHTSA) estimates that 533 fatalities per year are attributable to tire defects. Most defects are related to under-inflation.

Studies have found that fuel efficiency is reduced by one percent for every three PSI of under-inflation. A 2001 NHTSA study found that forty percent of automobiles had at least one tire under-inflated by at least six PSI. The Environmental Protection Agency (EPA) has estimated that as much as six billion gallons of gasoline (12.6 billion gallons of crude oil) could be saved annually by a fuel efficiency increase of just one mile per gallon (mpg). Proper tire inflation would make a substantial contribution toward achieving this increase in fuel efficiency. Fuel inefficiency also adds to the world's growing carbon dioxide emissions problem. Each gallon of gasoline used releases 20 pounds of carbon dioxide into the atmosphere.

In the U.S., more than 280 million tires are scrapped every year. Because it requires 1.75 gallons of fuel to produce one tire, millions of gallons of fuel could be saved annually by reducing tire wear and extending tire life through proper inflation.

Congress addressed these problems in 2000 by passing the Transportation Recall Enhancement, Accountability and Documentation (TREAD) Act, which mandates vehicle manufacturers to phase in tire pressure monitoring systems (TPMS) on all new light vehicles (i.e. those under 10,000 pounds). Sep. 1, 2007 was the date for full compliance. A TPMS informs the driver by means of a dash-mounted warning light when one or more of the tires is under-inflated. Because of cost and technology limitations, some TPMS may only alert the driver when pressure drops 25 percent or more below the manufacturer's recommended pressure. This could be over eight PSI, which many in the tire industry feel is an inadequate safety margin. Other problems with TPMS include failure of the driver to respond to the warning light. For example, it is possible that drivers may see the light come on when the tires are cold, but turn off after driving for a while which warms the tires and thereby raises the tire pressure. Drivers therefore may believe that the problem is not significant and that they can wait to service their tires. Or they may believe that the TPMS is faulty, in which case they may simply ignore it. Some TPMS even have a switch that allows a driver to turn off the warning light.

While the benefits of maintaining proper tire pressure are well documented, drivers do not always take action in response to the warning light because inflating tires is an unpleasant, dirty, inconvenient, and time-consuming task. Often the equipment needed to accurately inflate tires is not available when needed. Accurate inflation requires a pressure gauge as well as an adequate source of compressed air. Further, inflation should be performed when the tire is cold or the vehicle has been stationary for at least three hours. Without a pressure gauge, there is no way to reliably set pressure to the manufacturer's recommended level. If the tire is warm, then it is difficult for the driver to determine how much air to add so that there will be adequate pressure when the tire is cold. Vehicle manufacturers specify the cold tire pressure to assure there is adequate load carrying capability in the tire at the coldest service temperature.

As an alternative or supplement to TPMS, onboard automatic inflation systems have been available for many years for trucks and recreational vehicles. These systems include air compressors, individual tire pressure sensors, and the necessary valves and controls needed to automatically maintain proper pressure in each tire. Although these systems are potentially available for automobile use, their relatively high cost and complexity have inhibited their widespread use by light vehicle manufacturers.

SUMMARY OF THE INVENTION

The aforementioned problems are overcome in the present invention in which a tire pressure inflation regulator can be mounted on a conventional tire valve stem to automatically limit the pressure in the tire during inflation to a preset value preferably corresponding to the vehicle manufacturer's specification.

In a first aspect of the invention, the regulator accurately and positively cuts off flow of air into the tire when the preset pressure point is reached. For example, the regulator includes a two-position valve which is stable only in one of two positions. Consequently, the valve is either fully open or fully closed. The regulator therefore provides a highly precise cut-off at the preset pressure.

In a second aspect of the invention, the regulator is adjustable so that the inflation pressure can be set by the installer to meet the vehicle manufacturer's specifications, typically located on a placard mounted on the vehicle.

In a third aspect of the invention, the regulator is tamper proof following installation on the tire valve stem. The regulator can be readily screwed onto the valve stem by hand. However, the regulator can be removed only with the use of a special tool or key.

In a fourth aspect of the invention, the regulator includes its own cap, which protects the regulator and which can be easily removed by the operator for inflation. As disclosed, the regulator cap threads onto and off of the device in the manner of a standard valve stem cap. Further, the assembly includes an air-tight seal to prevent undesired loss of air when the cap is installed. Consequently, the cap maintains the same protective functions as the valve stem cap that it replaces. Specifically, it prevents debris from entering both the regulator and the tire valve stem. It offers a secondary seal in case the tire valve develops a leak.

These and other objects, advantages, and features of the invention will be more fully understood and appreciated by reference to the drawings and the description of the current embodiment.

DESCRIPTION OF THE CURRENT EMBODIMENT

Figure 6:
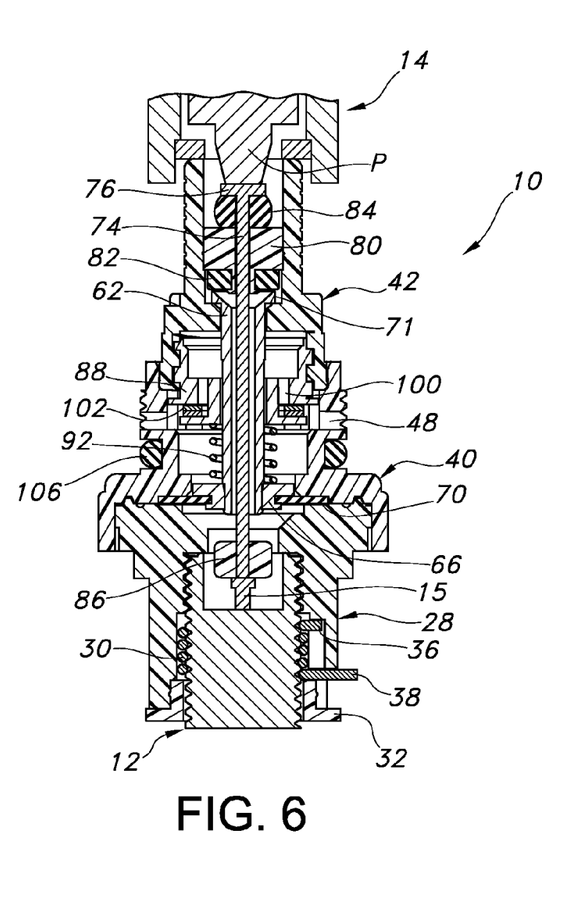
FIG. 6 is a view similar to FIG. 5 showing the regulator in the "inflating" position.
Figure 7:
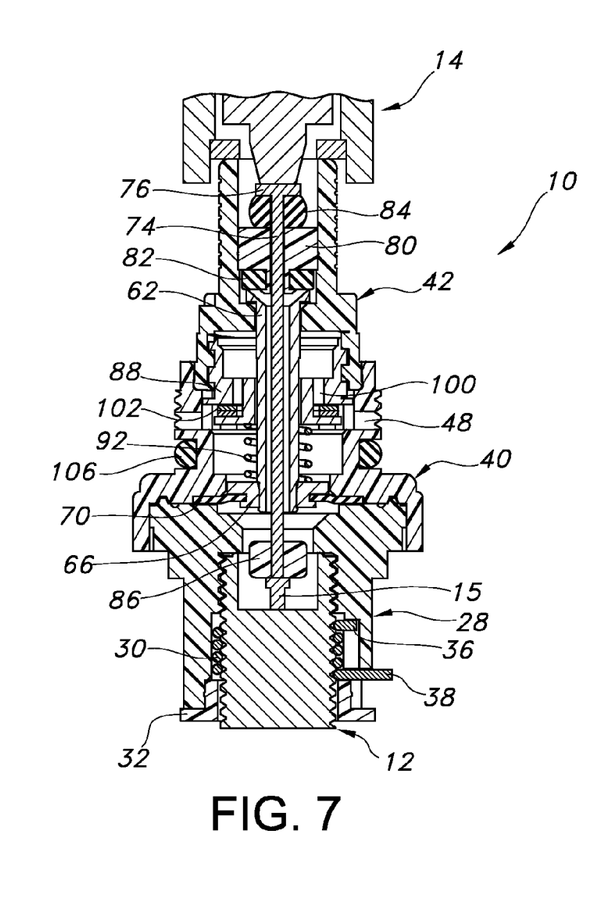
FIG. 7 is a sectional view similar to FIG. 5 showing the regulator in the "fully inflated" position.

A stem-mounted tire inflation pressure regulator constructed in accordance with the current embodiment of the invention is illustrated in the drawings and generally designated 10. As illustrated in FIGS. 1-2 and 5-7, the regulator 10 is mounted on conventional tire stem 12 of a conventional wheel. The regulator 10 receives a conventional air nozzle 14 as illustrated in FIGS. 6-7 to permit filling of the vehicle tire. A valve assembly 20 within the regulator 10 permits air to flow from the air nozzle 14 to the valve stem 12 until a preset pressure is achieved within the tire. The valve assembly 20 then snaps closed to prevent further filling of the tire beyond the present pressure. After the valve is closed, air from the nozzle 14 is diverted through an audible device to provide an audible signal to the operator.

I. Regulator

Figure 4:
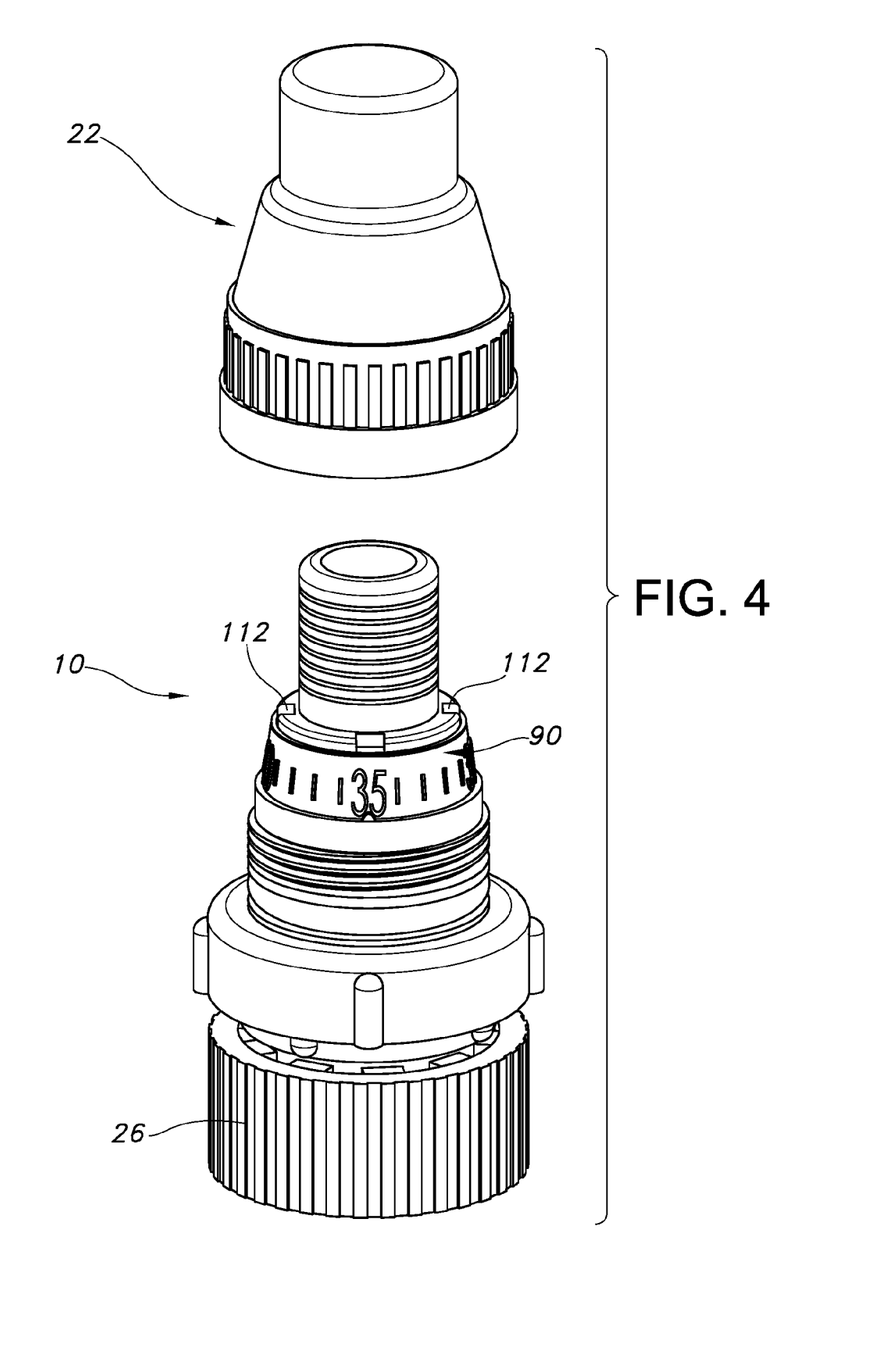
FIG. 4 is a perspective view similar to FIG. 3 but with the cap removed.
Figure 5:
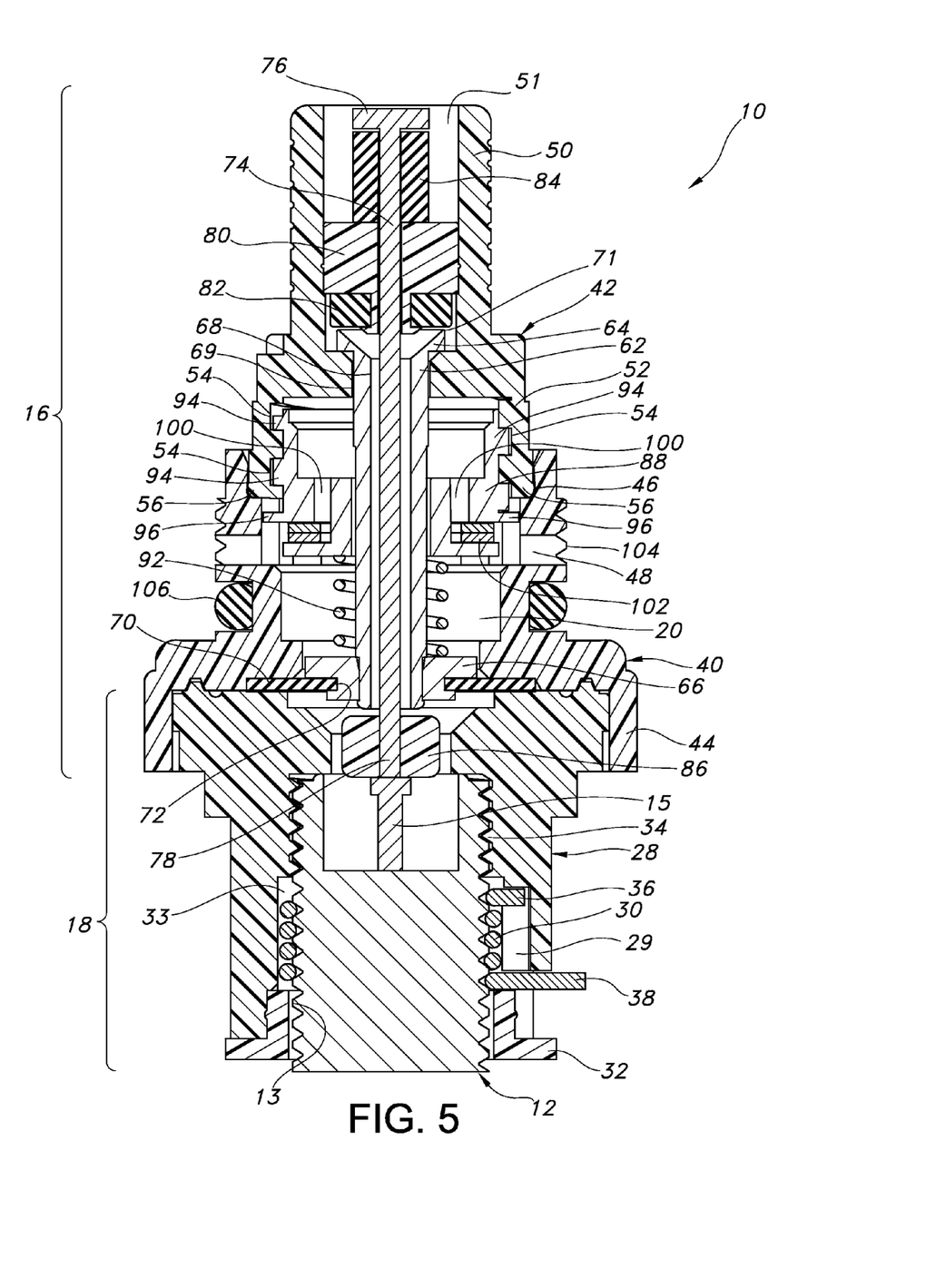
FIG. 5 is a sectional view through the regulator and the tire stem showing the regulator in the "ready" position.
Figure 8:
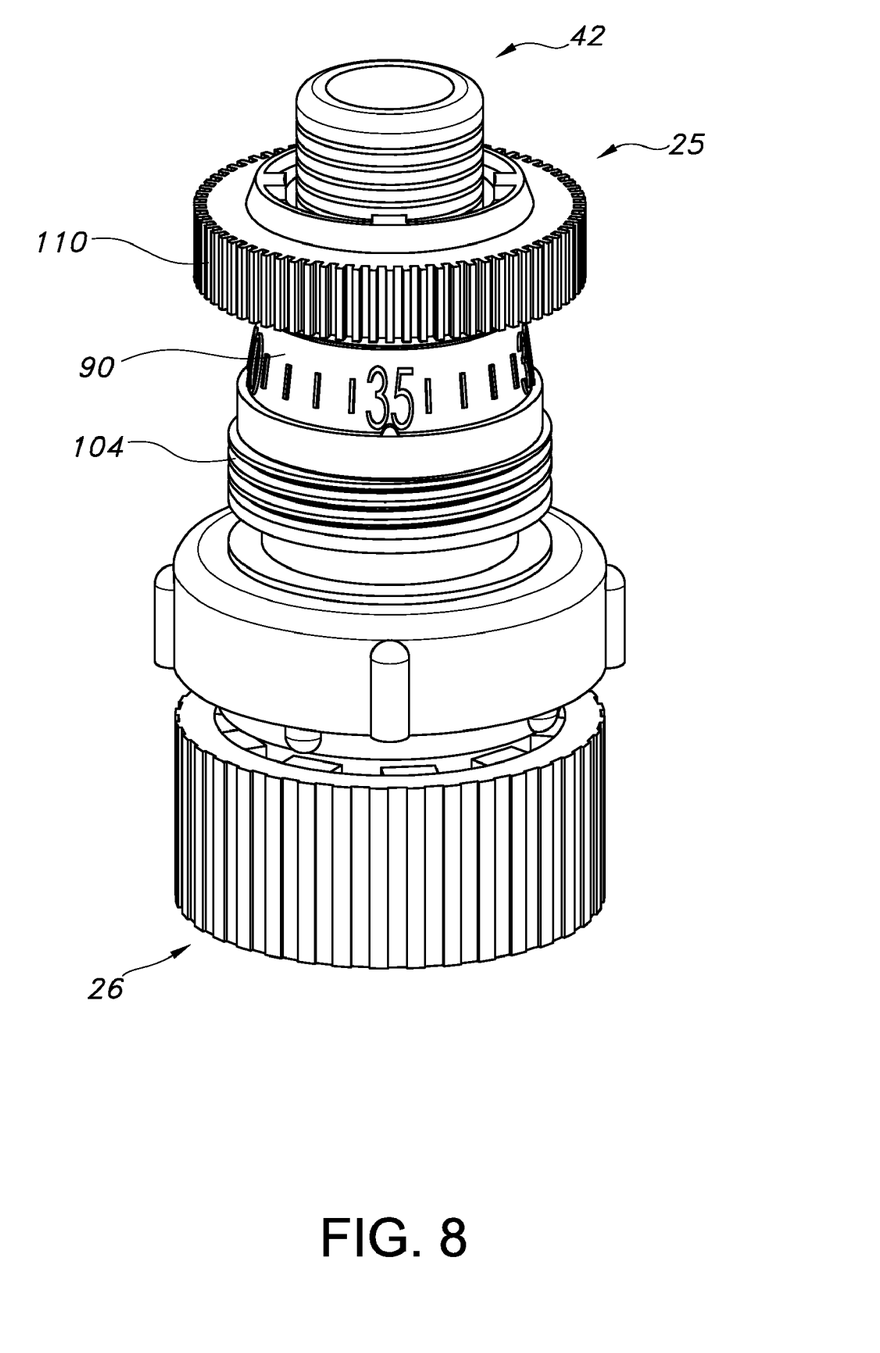
FIG. 8 is a perspective view similar to FIG. 4 and additionally showing the pressure adjustment key.
Figure 9:
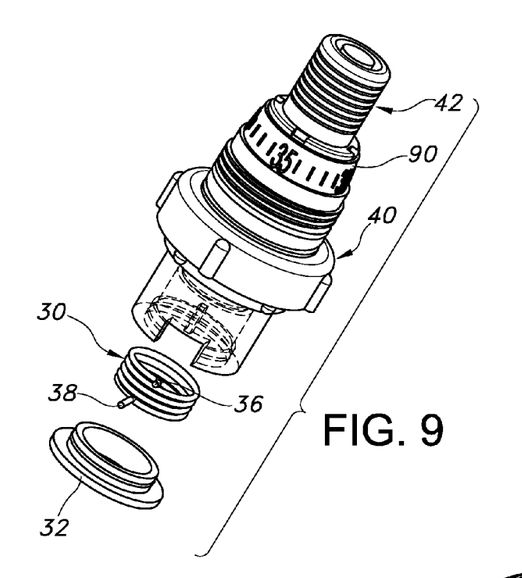
FIG. 9 is a perspective exploded view showing the thread lock mechanism.

As perhaps best illustrated in FIG. 5, the regulator 10 includes an upper assembly 16, a lower assembly 18, and a valve assembly 20. In addition to the regulator 10 itself, the regulator assembly also includes a cap 22 (FIGS. 2-3), a removal key 24 (FIGS. 3-4, 8, and 11-13), and a pressure adjustment key 24 (FIG. 8).

A. Lower Assembly

The lower assembly 18 (FIG. 5) provides a means for mounting the regulator 10 on the valve stem 12. More particularly, the lower assembly 18 includes a lower housing 28 that supports a coil spring 30 and a spring retainer 32 within an air outlet 33. The lower housing 28 may be threaded onto the valve stem 12, and the housing 28 is internally threaded at 34 to match the external threads of the valve stem. The lower housing defines an axially oriented slot for receiving the spring tang 36 as will be described.

The coil spring 30 is located below the threads 34 and includes a pitch matching the threads 34 as well as the threads of the valve stem. The spring 30 includes two tangs 36 and 38 that extend radially outwardly from the spring. The first tang 36 is closely received within the slot 29 to prevent the tang from rotating with respect to the lower housing 28. The lower tang 38 extends radially beyond the lower housing 28 so as to be accessible by the removal key (to be described). The lower tang 38 is permitted to move circumferentially to lock and unlock the regulator 10 as will be described.

The spring retainer 32 is fitted in the lower end of the lower housing 28 to retain the spring 30 in position. The lower housing 28 and the spring retainer 32 both are fabricated of plastic. Any suitable attachment technique or means may be used to intersecure the two pieces. Suitable means includes snap-fit, press-fit, screw-fit, bayonet-fit, and adhesive.

The tire stem 12 is of conventional design and includes an externally threaded portion 13 and a Schrader valve having a pin 15 (FIGS. 5-6). When the pin 15 is depressed, the Schrader valve opens and air may flow into or out of the tire through the stem 12. When the pin 15 is released, the Schrader valve closes, and air can no longer flow into or out of the tire.

B. Upper Assembly

The upper assembly 16 (FIG. 5) includes a base 40 and a top 42. The base 40 includes a skirt 44 fitted over and around the housing 28. The base 40 is fabricated of plastic and may be secured to the lower housing 28 in any suitable fashion. The upper portion of the base 40 defines an annular groove 46 for receiving the top 42 as will be described. The base 40 also defines a plurality of radially oriented vents 48 extending between the interior of the base and the exterior.

The top 42 is a single piece of plastic adapted to receive a conventional air nozzle (see FIGS. 6-7). More specifically, the top 42 includes an air nozzle receiver portion 50 defining an air inlet 51 and a regulator portion 52. The regulator portion 52 includes an internally threaded groove 54 for receiving the regulator shoe as will be described. An annular ridge 56 fitted within the annular groove 46 of the base 40. The top 42 is free to rotate within the base 40.

The indicator ring 90 (FIGS. 4, 8, and 11-12) is keyed to and rotates with the top 42. A visible scale is provided on the outside of the calibration ring 90 providing an indication of the preset pressure selected by rotating the top 42.

C. Valve Assembly

The valve assembly 20 is supported within the upper assembly 16 and more specifically within the base 40 and the top 42.

The assembly 20 includes a resiliently deformable diaphragm 70 whose peripheral portion is secured between the lower housing 28 and the base 40. The diaphragm is substantially planer and is washer-shaped. A spring retainer 66 is mounted within the diaphragm 70. The spring retainer 66 includes an internal groove 72 which receives the interior diameter of the diaphragm 70.

The valve assembly 20 further includes a guide 62 supported at one end by its shoulder 64 and at its opposite end by the spring retainer 66. The guide 62 includes an internal guide bore 68 through which air may flow into the tire as will be described and an external surface 69 spaced opposite the internal guide bore 68. The upper portion of the shoulder 64 terminates in a relatively narrow circumferential edge 71.

The valve assembly 20 also includes an actuator pin 74 having an upper end 76 and a lower end 78. The upper end 76 is pad-shaped and is adapted for engagement by the pin in the air nozzle 14. The actuator pin 74 is aligned with the Schrader valve pin 15 in the tire stem. Consequently, depression or actuation of the actuator pin 76 causes depression or actuation of the Schrader pin 15.

The valve assembly 20 (FIG. 5) further includes a sleeve 80 fitted within the top 42 and supporting the actuator pin 74. A compressible seal 82 is mounted on the lower end of the sleeve 80 in an annular groove. Another compressible seal 84 is mounted about the upper end of the actuator pin 74 between the pad 76 and the sleeve 80. A guide button 86 is carried by the lower end 78 of the actuator pin 74. The sleeve 80 and the guide button 86 are plastic, and each of the compressible seals is fabricated of any suitable resiliently compressible material.

A controllable spring force can be applied to the guide 62 by way of a regulator assembly including a regulator shoe 88, a calibration ring 90 (see FIG. 4), and a coil spring 92. The coil spring 92 is compressed between the regulator shoe 88 and the spring retainer 66. Thus, the regulator shoe 88 also serves as a spring retainer. The regulator 88 includes an external thread 94 which rides within the groove 54 in the top 42. Fingers 96 on the shoe 88 ride axially within the base 40 to prevent relative rotation of the two components. Consequently, rotation of the top 42 results in axial movement or adjustment of the shoe 88. Using a left-hand thread, greater spring force can be applied by rotating the top 42 in a clockwise direction (as viewed from the top of the regulator) and the spring force can be reduced by counterclockwise rotation of the top 42. A right-hand thread can be used, if desired, to provide an increase in spring force with counterclockwise rotation.

The shoe 88 includes vent ports 100. Conventional acoustic disks 102 are aligned with the vent ports 100. Consequently, air passing through the vent ports 100 also passes through the acoustic disks 102 causing them to provide an audible signal. The air then passes through the vent ports 48 in the base 40.

II. Regulator Cap

Figure 1:
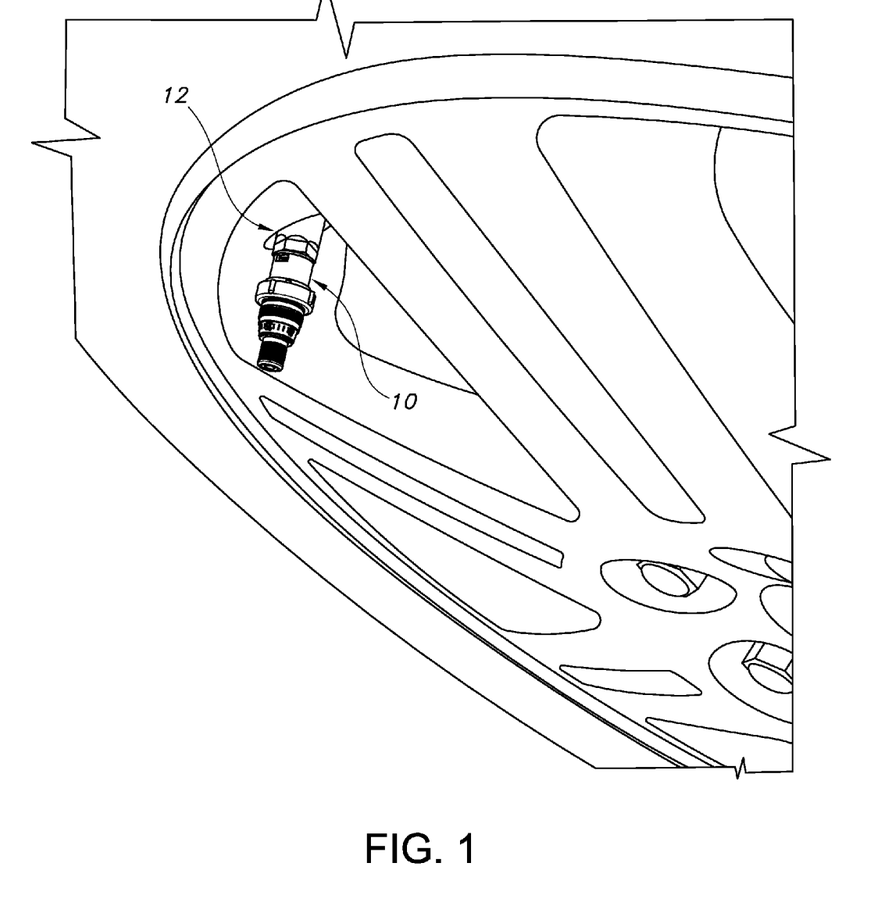
FIG. 1 is a perspective view of the stem-mounted pressure inflation regulator (without the cap) mounted on a conventional tire valve stem.
Figure 2:
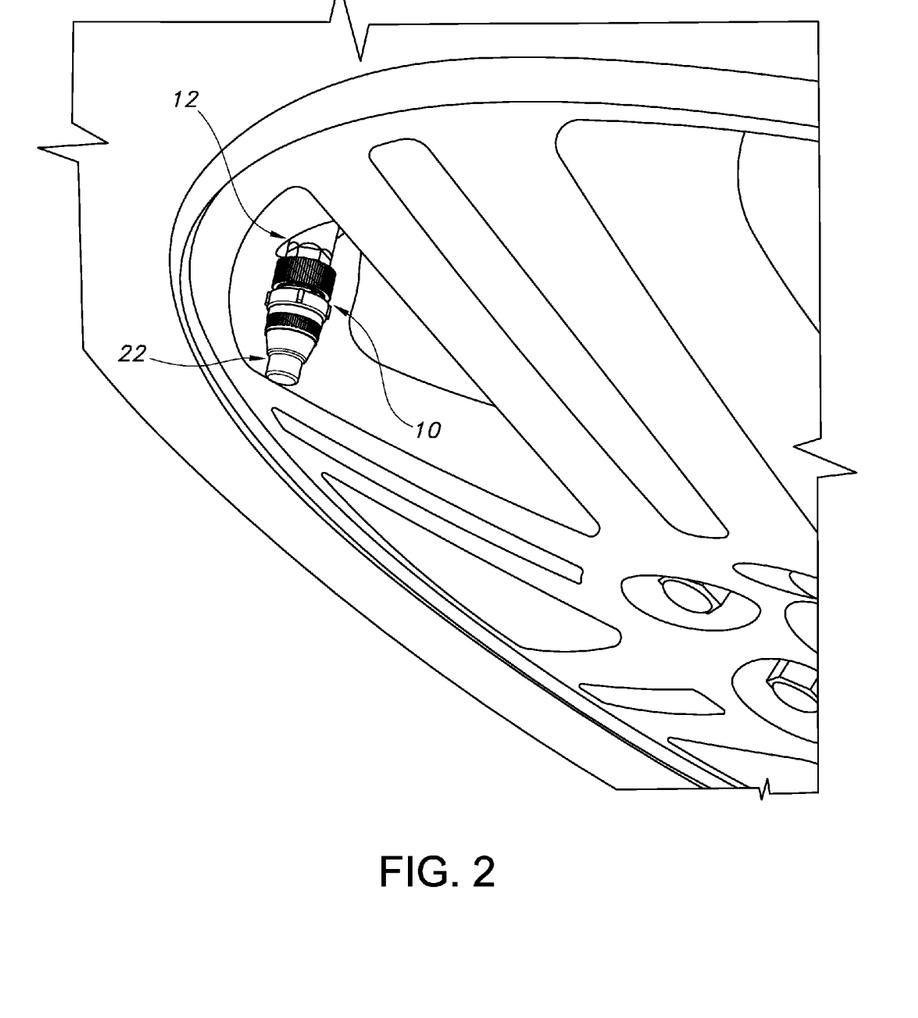
FIG. 2 is a perspective view similar to FIG. 1 but with the cap installed on the regulator.
Figure 3:
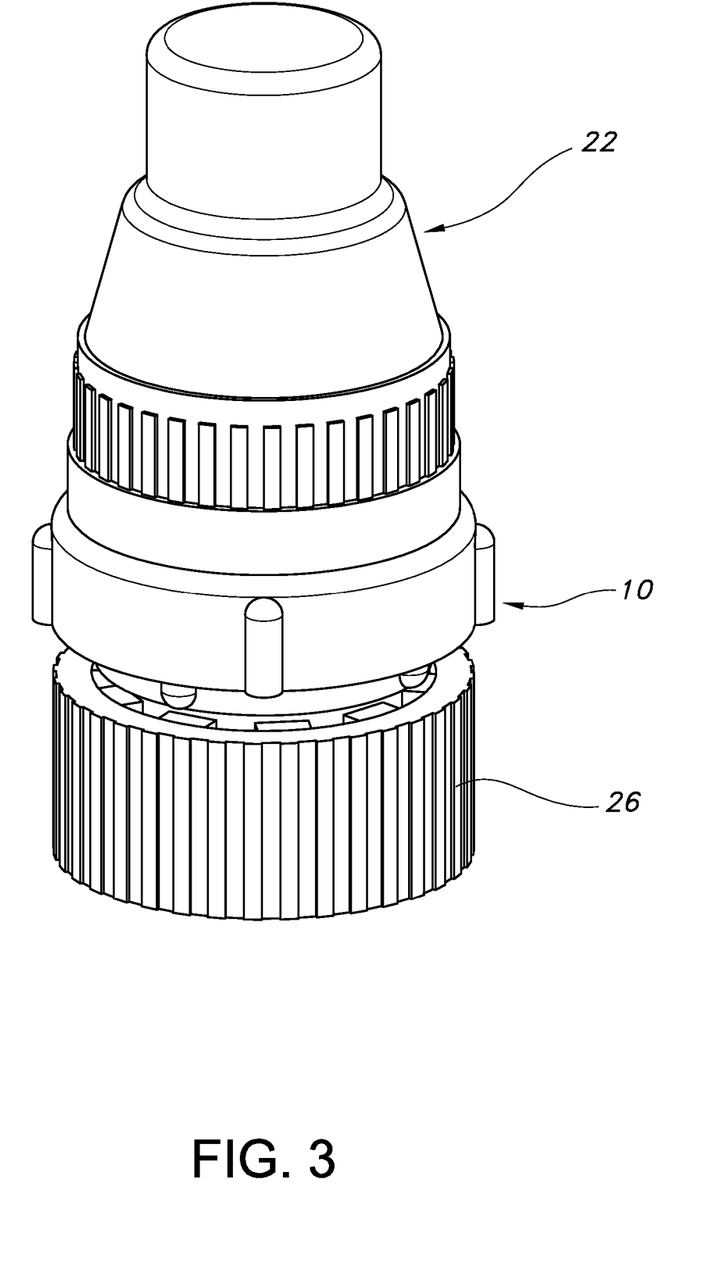
FIG. 3 is a perspective view of the pressure regulator with both the cap and the removal key installed.

The base 40 is externally threaded at its upper portion 104 to receive the cap 22 (see FIG. 3). An O-ring 106 provides an air-tight seal between the cap 22 and the regulator 10. Because both the air inlet 51 and the vent ports 48 are located under the cap 22 when the cap is installed, the cap prevents inadvertent or unwanted escape of air through the regulator 10 in case of failure or leakage of the Schrader valve within the stem 12.

III. Pressure Preset Key

The key 25 for rotating the top 42 is illustrated in FIG. 8. The key 25 includes a knurled exterior surface 110 and a plurality of protrusions (not visible) that interfit with the notches 112 (FIG. 4) in the top 42. The key is readily fitted over and readily removed from the top 42. Consequently, the top 42 may be easily manually rotated using the key 25, enabling the preset maximum pressure to be simply and easily adjusted. The key typically would be used only by the installer of the regulator 10.

IV. Regulator Removal Key

Figure 10:
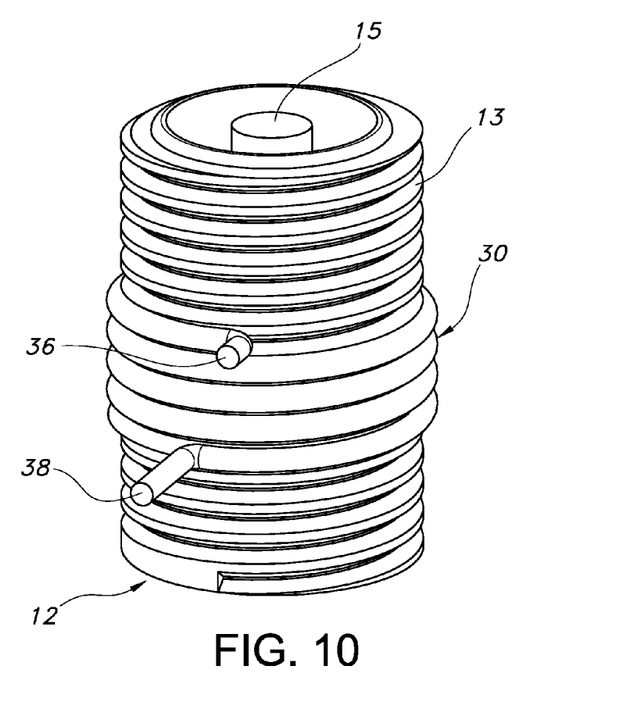
FIG. 10 is a perspective view showing the thread lock spring on a conventional tire stem.
Figure 11:
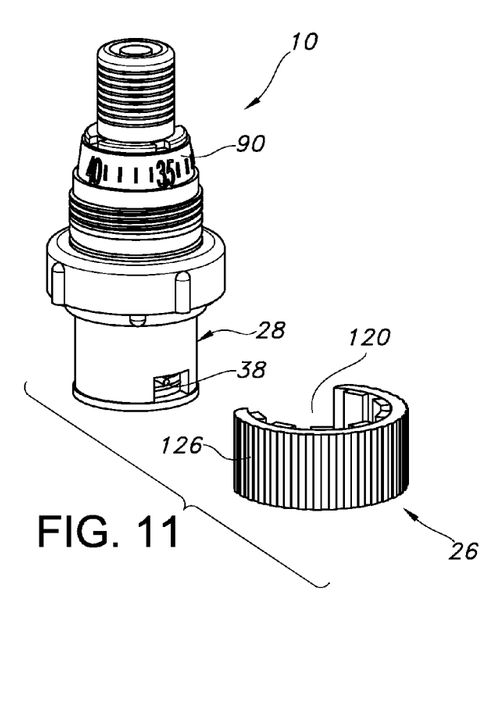
FIG. 11 is a perspective view similar to FIG. 4 showing the removal key separated from the regulator.

The coil spring 30 has approximately the same diameter of the tire stem 12. The friction between the stem 12 and the coil spring 30 tends to "open" the spring or expand it somewhat radially as the spring is turned onto the stem 12. Consequently, the coil spring 30 can be freely rotated onto the tire stem as the regulator 10 is turned or screwed onto the tire. However, the spring 30 prevents rotation in the "unscrewing" or removal direction. Because the upper tang 36 is held against rotation with respect to the lower housing 28, the spring 30 tightens around the tire stem 12 due to the friction therebetween. So, the spring 30 prevents relative rotation between the regulator 10 and the tire stem 12 in the removal direction.

The removal key 26 (FIGS. 3-4, 8, and 11-13) is required to remove the regulator 10 from the tire stem 12. The key 26 is generally a circular arc extending approximately 270 degrees thereby defining a mouth 120 capable of fitting over the lower housing 28. The interior wall of the key 26 includes a plurality of ribs 122 which in turn define grooves 124 therebetween. When the key is fitted over the regulator 10, the lower spring tang 38 extends into one of the grooves 124. The outer surface 126 of the key 26 is knurled to facilitate manual operation. Upon such rotation of the installed key 26, the tang 38 moves in a direction which loosens the spring 30 and enables the regulator 10 to be unscrewed from the tire stem. As with the pressure preset key 25, the removal key 26 typically is used only by an installer.

V. Operation

The first step in installing a regulator 10 on the valve stem 12 of a vehicle tire is to preset the desired maximum inflation pressure. This is done by placing the pressure preset key 25 (FIG. 8) over the top 42 and rotating the top until the desired pressure is indicated on the calibration ring 90. The maximum pressure typically will be the vehicle manufacturer's recommended cold tire pressure. After the maximum pressure has been preset or selected, the calibration key 25 is removed from the regulator 10.

The regulator 10 is then rotated or screwed onto the tire stem 12. As the regulator 10 is screwed onto the tire stem 12, the spring 30 first engages the threads 13 on the tire stem and ultimately the threaded portion 34 of the lower housing 28 also engages the threads of the tire stem. Because the spring 30 wants to "open" during rotation, the regulator 10 can be easily rotated onto the tire stem 12 manually without the use of any tools or keys. When the regulator 10 has seated on the valve stem 12, the regulator is ready for use. The regulator 10 is tamper proof after installation on the valve stem.

FIG. 5 illustrates the regulator 10 in the "ready" position, which is the normal or at-rest position without an air nozzle connected. The compressible seal 84 at the top of the stem provides an upward force on the actuator pin 74. Consequently, both the actuator pin 74 and the Schrader pin 15 in the tire stem 12 are in their relaxed or upper positions.

FIG. 6 illustrates the regulator 10 in the "inflating" position in which the conventional air nozzle 14 is placed over the top 42 of the regulator 10. When the nozzle is so positioned, the air nozzle pin P depresses the actuator pin 74 against the compression seal 84, so that the actuator pin depresses the Schrader pin 15 in the tire stem 12. When the air nozzle 14 is actuated, air flows from the air nozzle only to the tire stem 12 along the following path: first, through the air inlet 51 and past the compression seal 84, second between the top 42 and the sleeve 80, third past the compression seal 82 and the top 42, fourth between the compression seal 82 and the edge 71 of the guide 62, fifth through the internal guide bore 68 between the guide 62 and the actuator pin 74, sixth through the lower housing 28 past the guide button 86 and into the air outlet 33. The regulator 10 remains in the "inflating" position until the preset maximum pressure is reached at the valve stem 12. The valve assembly 20 prevents the flow of air from the air outlet 33 to the vent port 100 when in the "inflating" position.

The "fully inflated" position of the regulator 10 is illustrated in FIG. 7. Specifically, the valve assembly 20 moves to this position when the maximum pressure is reached, thereby preventing further air from flowing into the tire stem 12. When the pressure at the tire stem 12 reaches the maximum pre-selected pressure, that pressure against the diaphragm 70 and the spring retainer 66 overcomes the spring force of the spring 92. Consequently, the diaphragm and spring move upwardly in a rapid snap action from an unflexed position as shown in FIG. 6 to a flexed position as shown in FIG. 7. The valve assembly is unstable between the two positions illustrated in FIGS. 6-7. The movement of the diaphragm 70 and the spring retainer 66 moves the guide 62 upwardly within the regulator 10 until the upper edge 71 of the guide seats against the compressible seal 82. The engagement of the guide with the compressible seal prevents further air from flowing into the tire stem 12. In this position or configuration, air flows from the air hose 14 to only the vent ports 48 along the following path: first through the air inlet 51 and past the compression seal 84, second between the sleeve 80 and the top 42, third between the compression seal 82 and the top 42, third along the guide exterior surface 69 and between the guide 62 and the top 42, fourth through the vent ports 100, fifth past the acoustic disks 102, and sixth through the vent ports 48. The air flowing through the acoustic disks creates an audible alert signaling that the tire has achieved the preselected pressure. At this point, the operator removes the air nozzle 14 from the regulator 10; and the actuator pin 74 and the Schrader pin 15 return upwardly to the ready position illustrated in FIG. 5. The valve assembly 20 prevents the flow of air from the air outlet 33 to the vent port 100 when in the "fully inflated" position.

The valve assembly 20 has two positions and is stable only in the two positions. The valve assembly moves rapidly between the two positions in a "snap action" that does not permit the valve to remain in any position between the two positions. Consequently, the device responds rapidly to achievement of the maximum air pressure and thereafter terminates air flow into the tire and instead directs the flow promptly through the acoustic generator.

Following inflation, the cap 22 is installed by screwing the cap onto the threads 104 so that the cap seals against the O-ring 106. At this point, the regulator assembly appears as in FIGS. 2-3.

When the tires are to be "topped off" or otherwise returned to full inflation, the cap 22 is removed from the regulator by unscrewing. The rotational lock provided by the coil spring 30 prevents the regulator 10 from rotating when the cap is removed. Consequently, the regulator 10 can not be removed inadvertently with unscrewing of the cap 22.

Figure 12:
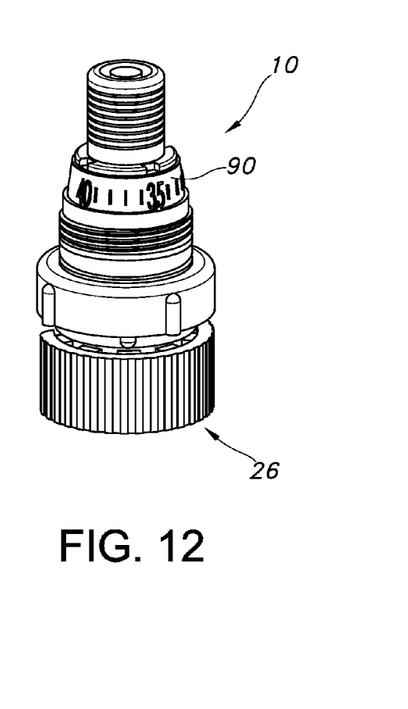
FIG. 12 is a perspective view similar to FIG. 11 showing the removal key installed on the regulator.
Figure 13:
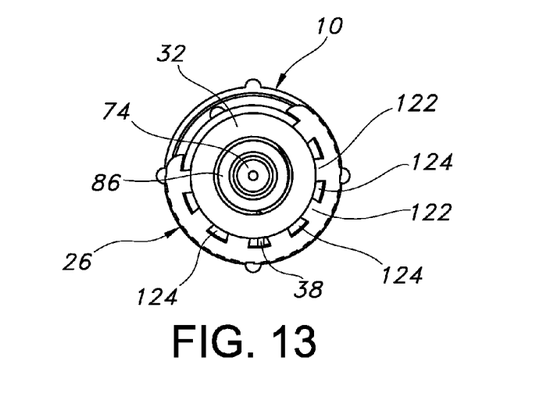
FIG. 13 is a bottom plan view of the regulator and key.

When the regulator 10 is to be removed from the stem 12, the corner key 26 is positioned on the regulator 10 as illustrated in FIGS. 3 and 12-13 so that the tang 38 is captured in one of the grooves 124. Rotational motion of the key 26 will first move the tang 38 to release the locking pressure, and continued movement rotates the regulator 10. With the spring 30 pressure released, the regulator 10 may be unscrewed manually without the need for tools or other assistance.

The regulator 10 has a relatively low mass, at least with the context of a wheel. Consequently, the regulator does not create tire imbalance, clearance problems, or excessive stem flexure at high speeds.

The regulator 10 does not interfere with or override the operation of the Schrader valve within the tire stem 12. In the ready position, the regulator allows the Schrader valve to close normally. When inflating the tire, the regulator 10 opens the Schrader valve to allow air into the tire. Removal of the air supply enables the Schrader valve to close to its normal position, ready for the next inflation cycle.

With the regulator 10 in place, normal tire maintenance should not require a pressure gauge, because the regulator includes a calibrated scale and acts automatically to maintain tires at the set point. However, the capability to use a pressure gauge is maintained. If tire pressure is at or below the set point, the pressure gauge should measure tire pressure directly without loss of air from the tire. If pressure readings are required on a tire with pressure above the set point (e.g. warm tire), the operator can remove the regulator 10 and connect the gauge directly to the tire valve stem 12.

Further as disclosed, the regulator does not interfere with or override the operation of the Schrader valve. When not in use inflating the tire, the device allows the Schrader valve to close normally. When inflating the tire, the device opens the Schrader valve to allow air into the tire and subsequently cut off flow of air into the tire at the preset pressure point. Removal of the air supply nozzle from the regulator allows the Schrader valve to close and reset to a normal position, ready for the next inflation cycle.

The above description is that of the current embodiment of the invention. Various alternations and changes can be made without departing from the spirit and broader aspects of the invention as set forth in the appended claims, which are to be interpreted in accordance with the principles of patent law, including the doctrine of equivalents.

The invention claimed is:

1. A tire pressure regulator assembly comprising:
a body assembly including an air inlet adapted to receive a conventional air nozzle and an air outlet adapted to connect to a conventional tire stem, the body assembly defining a vent port;
a two-position valve within the body assembly and including a flexible diaphragm supported by the body assembly, the valve having a first position directing air from the air inlet to only the air outlet, the valve having a second position different from the first position directing air from the air inlet to only the vent port, the valve being stable only in the first and second positions, the valve moving from the first position to the second position when the air pressure at the air outlet achieves a predetermined level, wherein the diaphragm is biased toward the first position and is responsive to air pressure at the air outlet to move the valve to the second position in a snap action when the air pressure achieves the predetermined level, wherein the two-position valve prevents the flow of air from the air outlet to the vent port in the first position and in the second position; and
an elongate guide defining an internal guide bore and an external guide surface, wherein:
air is directed through the internal guide bore and then to the air outlet when the valve is in the first position, and
air is directed along the external guide surface and then to the vent port when the valve is in the second position.

2. The tire pressure regulator assembly as defined in claim 1 wherein the valve includes a spring urging the diaphragm to the first position, wherein the diaphragm is capable of overcoming the force of the spring and moving to the second position when the air pressure achieves the predetermined level.

3. The tire pressure regulator assembly as defined in claim 1 wherein the valve includes a regulator for adjusting the predetermined level.

4. The tire pressure regulator assembly as defined in claim 3 wherein the regulator includes a visual indicator identifying the predetermined level.

5. The tire pressure regulator assembly as defined in claim 1 further comprising:
a cap removably attached to the body assembly over the air inlet and the air vent to prevent the undesired loss of air therethrough; and
a seal on at least one of the body assembly and the cap adapted to provide an airtight seal therebetween.

6. The tire pressure regulator assembly of claim 1 further comprising a compression seal adjacent the guide, wherein:
the guide is spaced apart from the compression seal in the first position to allow air flow into the internal guide bore and then to the air outlet; and
the guide abuts the compression seal in the second position to allow air flow along the external guide surface and then to the vent port.

7. The tire pressure regulator assembly of claim 1 wherein:
the diaphragm is substantially planar; and
the diaphragm is responsive to air pressure at the air outlet to move from an unflexed position to a flexed position and thereby actuate the valve.

8. A tire pressure regulator assembly comprising:
a body assembly including an air inlet adapted to receive a conventional air nozzle and an air outlet adapted to connect to a conventional tire stem, the body assembly defining a vent port;
a two-position valve within the body assembly, the two-position valve having a first position directing air from the air inlet to only the air outlet and a second position different from the first position directing air from the air inlet to only the vent port, the two-position valve being stable only in the first and second positions and moveable between the first and second positions in a snap action in response to air pressure at the air outlet, wherein the two-position valve prevents the flow of air from the air outlet to the vent port; and
an elongate guide defining an internal guide bore and an external guide surface, wherein:
air is directed through the internal guide bore and then to the air outlet when the valve is in the first position, and
air is directed along the external guide surface and then to the vent port when the valve is in the second position.

9. The tire pressure regulator assembly of claim 8 wherein the valve includes a substantially planar diaphragm moveable between an unflexed position to a flexed position to thereby move the valve between the first and second positions.

10. The tire pressure regulator assembly of claim 9 wherein the diaphragm is supported by the body assembly and flexes in a snap action to the flexed position when the air pressure at the air outlet achieves a predetermined level.

11. The tire pressure regulator assembly of claim 9 further including a spring urging the diaphragm to the unflexed position, wherein the diaphragm is capable of overcoming the spring in the flexed position when the air pressure achieves the predetermined level.

12. The tire pressure regulator assembly of claim 8 further including a compression seal adjacent the guide, wherein:
the guide is spaced apart from the compression seal in the first position to allow air flow into the internal guide bore and then to the air outlet; and
the guide abuts the compression seal in the second position to allow air flow along the external guide surface and then to the vent port.

13. The tire pressure regulator assembly of claim 8 wherein the valve includes a regulator for adjusting the predetermined level.

14. The tire pressure regulator assembly of claim 13 wherein the regulator includes a visual indicator identifying the predetermined level.

15. The tire pressure regulator assembly of claim 8 further comprising:
a cap removably attached to the body assembly over the air inlet and the air vent to prevent the undesired loss of air therethrough; and
a seal on at least one of the body assembly and the cap adapted to provide an airtight seal therebetween.

* * * * *